(12) United States Patent
Brew et al.

(10) Patent No.: US 10,540,224 B2
(45) Date of Patent: **\*Jan. 21, 2020**

(54) EVENT RELATIONSHIP ANALYSIS IN FAULT MANAGEMENT

(71) Applicant: International Business Machines Corporation, Armonk, NY (US)

(72) Inventors: Anthony T. Brew, Blackrock (IE); Jonathan I. Settle, London (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,827

(22) Filed: Nov. 21, 2018

(65) Prior Publication Data

US 2019/0095267 A1  Mar. 28, 2019

Related U.S. Application Data

(63) Continuation of application No. 15/044,200, filed on Feb. 16, 2016, now Pat. No. 10,176,034.

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0793* (2013.01);
(Continued)

(58) Field of Classification Search
CPC ............ G06F 11/3058; G06F 11/0751; G06F 11/0793; G06F 11/0748; H04L 41/16; H04L 41/0869; H04L 41/0853
See application file for complete search history.

(56) References Cited

U.S. PATENT DOCUMENTS 5,483,637 A * 1/1996 Winokur ................. H04L 43/00
714/26
5,848,143 A * 12/1998 Andrews ............... H04M 3/493
379/265.09

(Continued)

OTHER PUBLICATIONS

List of IBM Patents or Patent Applications Treated as Related, Dec. 6, 2018, 2 pages.

(Continued)

*Primary Examiner* — Bryce P Bonzo
*Assistant Examiner* — Jeison C Arcos
(74) *Attorney, Agent, or Firm* — Heslin Rothenberg Farley & Mesiti P.C.; Alexander Jochym, Esq.

(57) ABSTRACT

Method and system are provided for event relationship analysis in fault management. The method includes: providing a history of a plurality of event instances relating to multiple events identified by event identifiers, where an event instance has one or more event occurrences referencing an event identifier, the history including the event occurrences and resolution event information; analyzing the event occurrences relating to each event identifier to identify a first occurrence(s) of an event instance; analyzing the resolution event information relating to each event identifier to identify any event resolution time for an event instance; comparing two event identifiers to obtain a relationship score between the two event identifiers, wherein the comparing is based on a combination of first occurrences of event instances relating to the two event identifiers and resolution times of the event instances; and creating a group of events that are related based on the relationship scores.

20 Claims, 9 Drawing Sheets

(51) Int. Cl.
*H04L 12/26* (2006.01)
*H04L 12/24* (2006.01)

(52) U.S. Cl.
CPC .......... *H04L 41/064* (2013.01); *H04L 41/065* (2013.01); *H04L 43/16* (2013.01)

(56) References Cited

U.S. PATENT DOCUMENTS

| | | | | |
|---|---|---|---|---|
| 6,023,507 | A * | 2/2000 | Wookey | G06F 11/2294 380/285 |
| 6,529,954 | B1 * | 3/2003 | Cookmeyer, II | H04L 41/16 706/47 |
| 6,738,811 | B1 * | 5/2004 | Liang | H04L 41/147 709/224 |
| 7,003,779 | B2 | 2/2006 | Riosa et al. | |
| 7,277,783 | B2 * | 10/2007 | Predelli | G05B 19/0421 701/48 |
| 7,631,058 | B2 | 12/2009 | Grabarnik et al. | |
| 8,453,165 | B2 | 5/2013 | McKinney | |
| 8,626,894 | B2 | 1/2014 | Chen et al. | |
| 2001/0016789 | A1 * | 8/2001 | Staiger | B60R 16/0231 701/1 |
| 2002/0100017 | A1 | 7/2002 | Grier | |
| 2003/0105537 | A1 | 6/2003 | Crispin | |
| 2003/0149919 | A1 * | 8/2003 | Greenwald | G06F 11/2257 714/43 |
| 2004/0088140 | A1 * | 5/2004 | O'Konski | G06F 11/0709 702/183 |
| 2004/0225381 | A1 * | 11/2004 | Ritz | G06F 11/0709 700/26 |
| 2004/0236820 | A1 * | 11/2004 | Flocken | G06F 11/0709 709/200 |
| 2005/0188268 | A1 * | 8/2005 | Verbowski | G06F 11/0748 714/37 |
| 2005/0234824 | A1 * | 10/2005 | Gill | H04L 63/105 705/50 |
| 2006/0149408 | A1 * | 7/2006 | Speeter | G06F 8/71 700/126 |
| 2006/0242286 | A1 * | 10/2006 | Hawkins | G06F 11/0709 709/223 |
| 2007/0150480 | A1 * | 6/2007 | Hwang | G06Q 10/00 |
| 2008/0183704 | A1 * | 7/2008 | Miller | G06N 5/02 |
| 2009/0006156 | A1 * | 1/2009 | Hunt | G06Q 10/063 705/7.11 |
| 2009/0028053 | A1 * | 1/2009 | Kannan | G06F 11/0712 370/241 |
| 2009/0199118 | A1 * | 8/2009 | Sabato | G06F 11/321 715/765 |
| 2009/0271232 | A1 * | 10/2009 | Waguet | G06Q 10/06 705/7.36 |
| 2010/0318856 | A1 * | 12/2010 | Yoshida | G05B 23/024 714/47.1 |
| 2011/0119219 | A1 * | 5/2011 | Naifeh | H04L 41/0604 706/47 |
| 2012/0266020 | A1 * | 10/2012 | Souvannarath | G06F 11/0709 714/26 |
| 2013/0179793 | A1 | 7/2013 | Duggan et al. | |
| 2014/0019795 | A1 * | 1/2014 | Sonoda | G06F 11/0751 714/2 |
| 2014/0237297 | A1 | 8/2014 | Nagura et al. | |

OTHER PUBLICATIONS

Thoenen et al., "Even Relationship Networks: A Framework for Action Analysis in Event Management", IBM Research Report—Computer Science, RC 21843 (98313), Sep. 28, 2000 (17 pages).
Venikatasubramanian, "A Review of Process Fault Detection and Diagnosis Part III: Process History Based Methods", Apr. 22, 2002, Elsevier Science, pp. 1-20.

* cited by examiner

EVENT RELATIONSHIP ANALYSIS IN FAULT MANAGEMENT

BACKGROUND

The present invention relates to event relationship analysis in fault management, and more specifically, to relationship strength analysis for event grouping.

Data center and network management disciplines to date have focused extensively on fault and root cause analysis processes, tools and best practices. When events occur in a data center, a notification is sent to an event manager (for example, such as IBM's Netcool OMNIbus or Netcool Operations Insight (NOI), where Netcool, OMNIbus and IBM are trademarks of International Business Machines Corporation, Armonk, N.Y.).

At the event manager, the event may be de-duplicated, correlated, and enriched. It may be handled via a policy enforced by a rules engine. It may be used to automatically create a ticket for a help desk. Events and tickets are the backbone of fault management. Meeting the requirement to reduce operation cost and hence increase return on investment, correlation of commonly co-occurring alerts together allow the operator to only work on one problem or one ticket open for an single problem.

Event manager products deploy grouping mechanisms to find recurrent patterns in the event stream so that when operators are presented with a set of incoming events the list is compacted as much as possible with already observed relations. This provides immense value as it directly reduces cost in a very measurable way for customers.

The grouping of events based on faults in the system data is not trivial. To facilitate nuances in how events arrive at a common collection point, an event grouping mechanism may already requires considerable injection of domain knowledge about the typical behavior of probes and event types commonly found.

SUMMARY

In one or more aspects, a computer-implemented method is provided for event relationship analysis in fault management. The computer-implemented method includes: providing a history of a plurality of event instances relating to multiple events identified by event identifiers, wherein an event instance has one or more event occurrences referencing an event identifier and each event occurrence has a timestamp, the history including the event occurrences and resolution event information; analyzing the event occurrences relating to each event identifier to identify one or more first occurrence of an event instance; analyzing the resolution event information relating to each event identifier to identify any event resolution time for an event instance; comparing two event identifiers to obtain a relationship score between the two event identifiers; wherein the comparing is based on a combination of first occurrences of event instances relating to the two event identifiers and resolution times of the event instances; and creating a group of events that are related based on the relationship scores.

In one or more other aspects, a system for event relationship analysis in fault management is provided. This system includes a memory, and a processor communicatively coupled to the memory to perform a method comprising: providing a history of a plurality of event instances relating to multiple events identified by event identifiers, wherein an event instance has one or more event occurrences referencing an event identifier and each event occurrence has a timestamp, the history including the event occurrences and resolution event information; analyzing the event occurrences relating to each event identifier to identify one or more first occurrence of an event instance; analyzing the resolution event information relating to each event identifier to identify any event resolution time for an event instance; comparing two event identifiers to obtain a relationship score between the two event identifiers, wherein the comparing is based on a combination of first occurrences of event instances relating to the two event identifiers and resolution times of the event instances; and creating a group of events that are related based on the relationship scores.

In one or more further aspects, a computer program product is provided for event relationship analysis in fault management. The computer program product includes a computer readable storage medium having program instructions embodied therewith, the program instructions being executable by a processor to cause the processor to perform a method comprising: providing a history of a plurality of event instances relating to multiple events identified by event identifiers, wherein an event instance has one or more event occurrences referencing an event identifier and each event occurrence has a timestamp, the history including the event occurrences and resolution event information; analyzing the event occurrences relating to each event identifier to identify one or more first occurrence of an event instance; analyzing the resolution event information relating to each event identifier to identify an event resolution time for an event instance; comparing two event identifiers to obtain a relationship score between the two event identifiers, wherein the comparing is based on a combination of first occurrences of event instances relating to the two event identifiers and resolution times of the event instances; and creating a group of events that are related based on the relationship scores.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention are described below, by way of example only, with reference to the drawings, in which.

Figure 1:
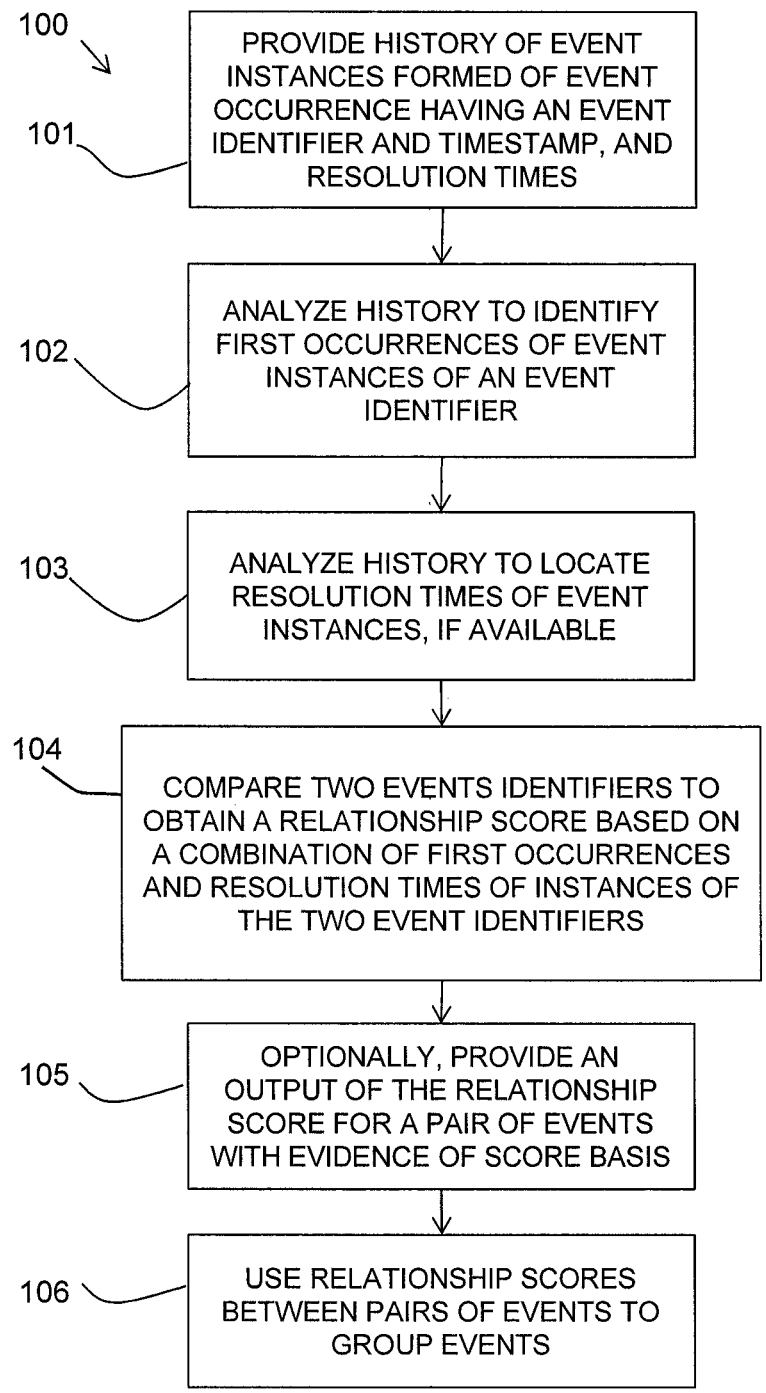
FIG. 1 is a flow diagram of an example embodiment of a method, in accordance with one or more aspects of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system relate to discovering relationships between events in an event management system that may be used for fault management. In the described method and system relationships are determined from historic data based on an analysis of a combination of first occurrences (FO) of events and resolution times (RT) of events.

In one or more aspects, the described method creates a variation of rule mining to specifically utilize the information encoded in the resolution of events. This may reduce the number of recurrences of a problem when resolution events can be relied on.

The method relies on analyzing a body or archive of events, in which some events have been triggered and can be seen to have a first occurrence (of the current instance of the problem) and, in at least some cases, to have been associated with resolutions.

Event management systems lend themselves to event actions and life cycle and enrich events with additional information of the events. The method analyzes the body of events that have been so enriched and by utilizing the information about the events' first occurrence and the events' resolution learns relations faster than by using the first occurrence alone, and without the drawback of weakening relations using poorly formed resolution times.

The described method addresses the issue that while a first occurrence of an event is a reliable indicator; the resolution time of the problem can be misleading; however, using the resolution times of events may contribute to the relationship analysis between events.

Resolutions are sent to an event when it is considered that the problem is resolved, however this can be error prone for a number of reasons and these potential errors are minimized by the described method.

A resolution event may resolve multiple problem events and the same resolution may be seen for the different problem events.

Resolution events do not always happen at the same time. Systems often report problems quickly together, though the act of fixing all the systems could be a manual process taking many hours. For example, an array going offline in a storage sub system might cause, logical unit numbers (LUNs) or drives at a machine to go offline and applications to fail. The problem would general report quickly and can be fully automated, but other resolution may be manually triggered with delay.

Resolution events are not guaranteed to happen, some system do not report the fact that a problem has been resolved and it is up to the operator to clear the event.

It is not common to have an explicit field containing a resolution time although, in some systems, this may be provided. If it is not provided it may be computed from the event archive for most problem events.

Referring to FIG. 1, a flow diagram 100 shows an example embodiment of the described method.

The described method relies on analyzing a provided body 101 or archive of historical events that includes multiple event occurrences with each occurrence having an event identifier (which acts as a primary key) and a timestamp. The event identifier describes what has happened and to what devices. As an example, an event identifier may be "database fail on host A". The event identifier will occur multiple times across the data set, so for each event identifier there will be a list of event occurrences.

An event instance is defined as being a group or cluster of occurrences in a time window relating to an event identifier, and an event instance will have a first occurrence and may have a resolution time (although in some instance this may not be available). For example, an event instance may represent a particular problem.

Event management systems provide historical data stores, where each event has a unique identifier that identifies its recurrence across time. As problems re-cur (event instances) they are attributed a first occurrence and these may either clear or be resolved with a resolution time. Each event identifier has multiple possible first occurrences and multiple possible resolution times across the historic archive.

The body of historical events may have event instance resolution times added to it or may be analyzed to extract resolution information. In some systems, resolution events are provided which may relate to one or more event identifier. The resolution events may include the event identifier to which they relate, or may require a mapping from a resolution identifier to event identifiers.

The body of historical events may be analyzed 102 to identify first occurrences of an event instance of an event identifier. A first occurrence may locate the first event occurrence with an event identifier after a threshold period of no event occurrences of the event identifier or after a previous resolution of event occurrences of the event identifier. A first occurrence identifies the start of a problem. There may be multiple first occurrences of an event identifier within the time period of the body of historical events.

The body of historical events may also be analyzed 103 to locate resolution times of an event identifier. To obtain resolution times of an event identifier, a resolution identifier may require mapping to event identifiers which it resolves. As discussed above, resolution times are not as reliable an indicator as first occurrence of an event identifier due to problems in accurate recording of event resolution.

As a starting point assume for each event identifier in the historic archive there is a list of occurrences and resolution times:

```
{
    occurrences time of problem,
    resolution occurrence time
}
```

As stated before, a resolution event can pertain to multiple events so naïvely passing it in does not work and analysis of the resolution events may be required.

Two event identifiers may be compared 104 by analyzing and scoring their event instances occurrences including both their first occurrences of instances and their resolution times of instances to obtain a relationship score between the two event identifiers. Due to the more reliable indications being the first occurrences, the first occurrences may be scored and these scores may be weighted by the resolution times when available. Put another way, the resolution times may be used to augment the scoring based on first occurrences.

There may be event occurrences relating to multiple event identifiers within a time window, and the method carries out a pair-wise analysis to test all possibilities, so that all event occurrences in a time window are compared.

An output of the relationship score may be provided 105 with evidence of the score basis. When relationships are discovered it is common for end users to wish to understand why there is a relationship. Therefore, at this point evidence of why the relation was uncovered (supporting pairs of first occurrences and used the supporting pairs of resolutions) may be presented to the end user.

The relationship scores between event identifiers may also be used 106 to group events. The grouping of events may be used by correlation rules and policies may be created from deployed correlation rules. The policies may then take action on real time events to group events for presentation of a reduced number of events to an operator.

Figure 2:
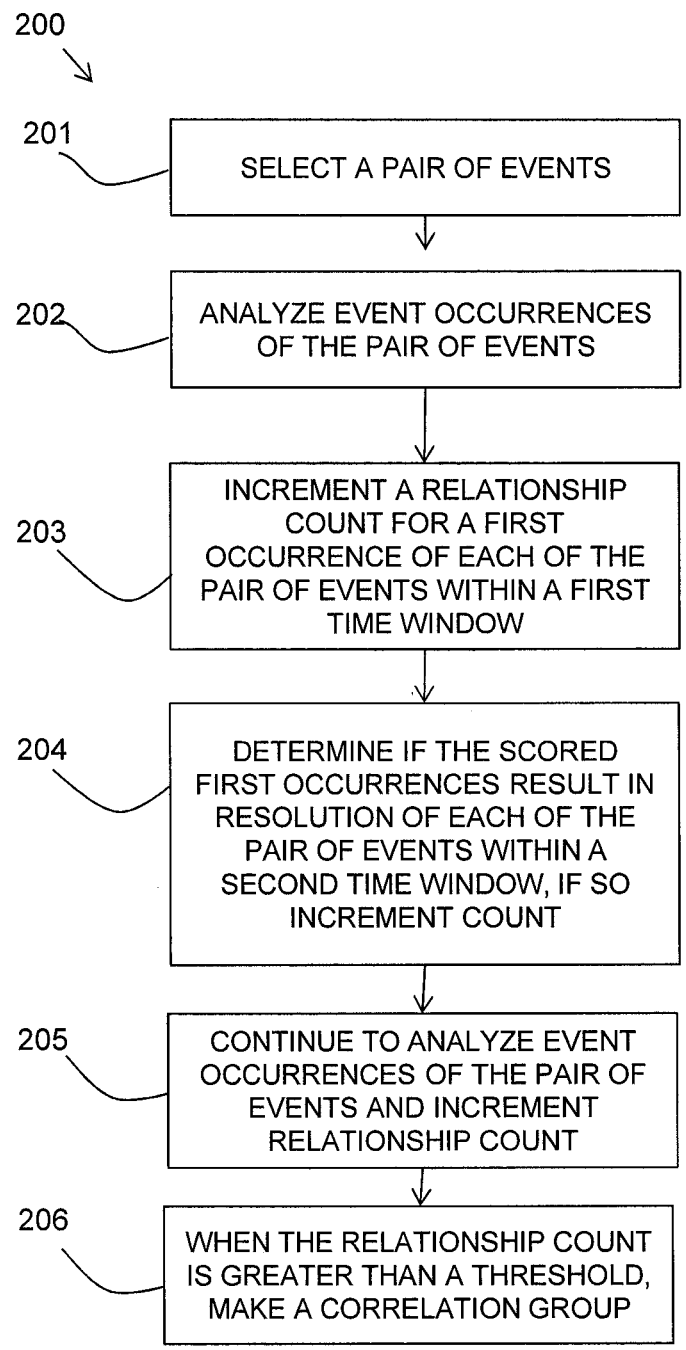
FIG. 2 is a flow diagram of a first example embodiment of an aspect of the method of FIG. 1, in accordance with one or more aspects of the present invention.
Figure 3:
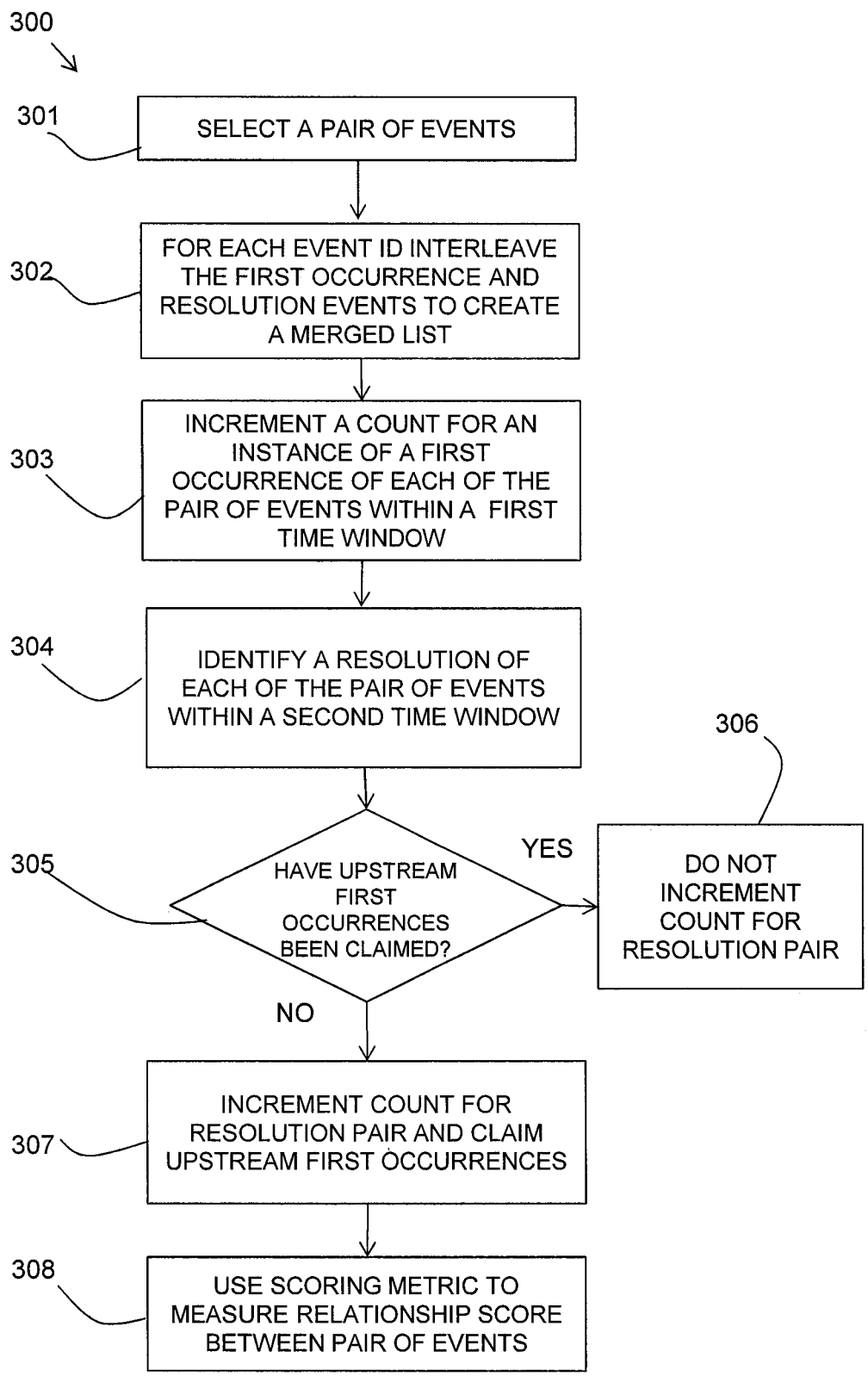
FIG. 3 is a flow diagram of a second example embodiment of an aspect of the method of FIG. 1, in accordance with one or more aspects of the present invention.
Figure 4:
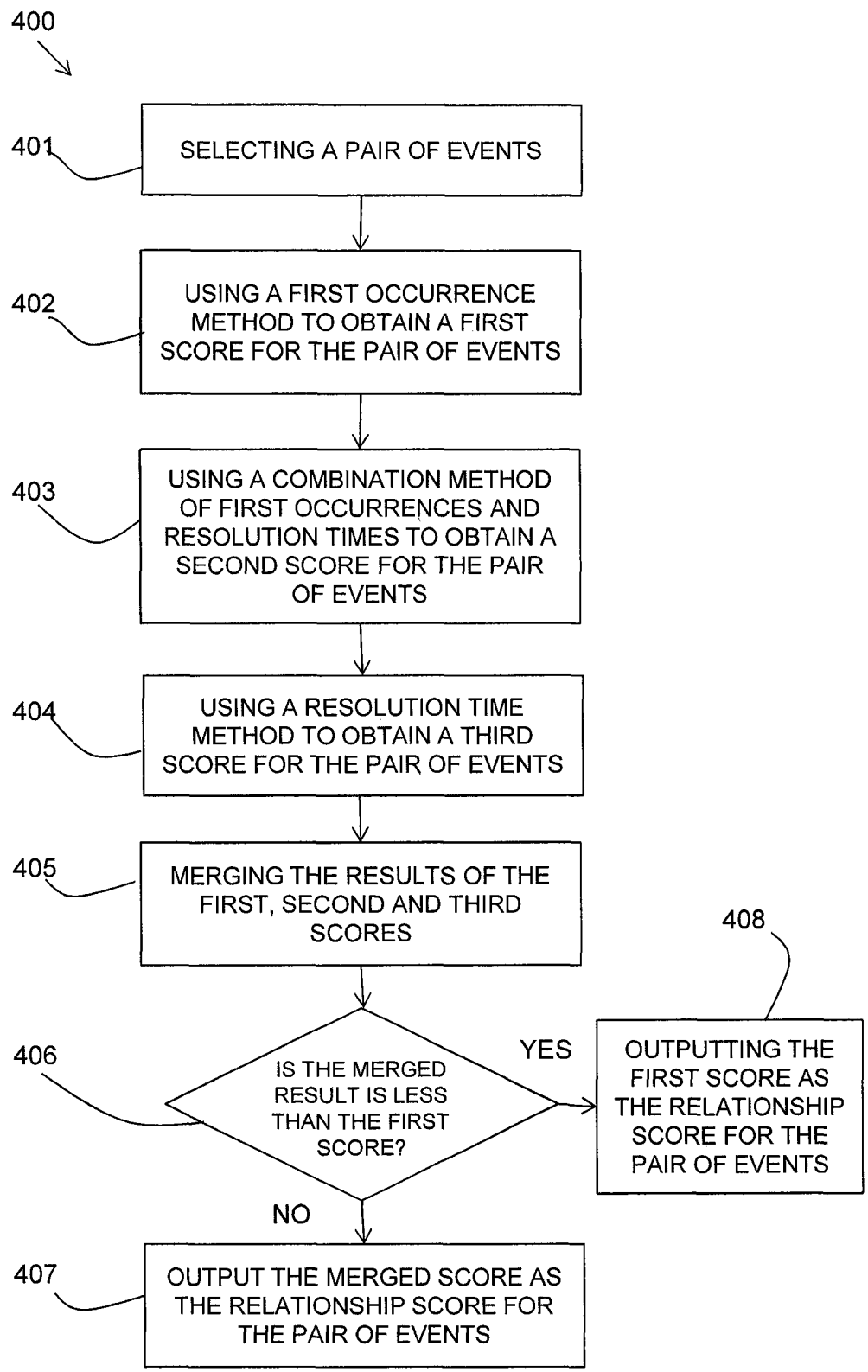
FIG. 4 is a flow diagram of a third example embodiment of an aspect of the method of FIG. 1, in accordance with one or more aspects of the present invention.

FIGS. 2, 3 and 4 show example embodiments comparing two event identifiers by analyzing and scoring their event instances including both their first occurrence of instances and their resolution times of instances to obtain a relationship score between the two event identifiers.

Referring to FIG. 2, a flow diagram 200 shows a first example embodiment carried out for a pair of events selected 201 for analysis. The two events have event identifiers. The event occurrences in the body of historical events, which reference the two event identifiers, are analyzed 202.

First occurrences of an event instance of each of the selected event identifiers occurring within a first time window are identified and a relationship score for the pair of event identifiers incremented 203.

It may then be determined 204 if the scored first occurrences result in resolution of the two events within a second time window. It should be noted that the time window for event resolutions may be longer than the time window for first occurrences providing more leeway for event resolution to be recorded. If it is determined 204 that the scored first occurrences result in resolutions, then the relationship score may be incremented or increased by a given factor.

The event occurrences may be continued 205 to be analyzed for later first occurrences of event instances of the pair of events and possible resolution.

A threshold of a relationship score may be provided and when this threshold is reached, a correlation group may be formed 206 including the two event identifiers in the group. Additional relationship scores above the threshold between one of the event identifiers in the group and another new event identifier, enables the new event identifier to be added to the group.

The following is a worked example of the method of FIG. 2. The method works by boosting the event instances' number if there is a supporting resolution relationship but does not count against the relationship if there is not one.

In this example:
Event A occurs at 1 April 10:23 AM and resolved on 1 April 14:44 PM
Event B occurs at 1 April 10:24 AM and resolved on 1 April 14:45 PM
Event A occurs at 12 April 11:43 AM and resolved on 12 April 18:44 PM
Event B occurs at 12 April 11:44 AM and resolved on 12 April 18:45 PM Event A and B both occur at the 10:23 and 10:24 which is within an observation window. Due to this co-occurrence, a score may be incremented by one count. Then looking at the resolution times, the resolution times are also within an observation window. Therefore, this may increase the score additionally, for example, by two instead of one. When event A and B occur again on the 12 April at 11:44 within an observation window, the count is again incremented. A threshold of scores may be used to make a correlation group. For example, three observations resulting in scores may make a correlation group at that time.

The method may weight the problem event (the first occurrence count) more than the resolution event and a lack of resolution of problem events does not count against the possibility of correlation in a group.

In this example:
Event A occurs at 1 April 10:23 AM and resolved on 1 April 14:44 PM
Event C occurs at 1 April 10:24 AM and resolved on 1 April 16:45 PM
Event A occurs at 12 April 11:43 AM and resolved on No resolution
Event C occurs at 12 April 11:44 AM and resolved on 12 April 11:45 PM
Event A occurs at 28 April 14:23 AM and resolved on 28 April 14:44 PM
Event C occurs at 28 April 14:24 AM and resolved on 28 April 19:45 PM The above would still from a group but only when the three instances of the problem have happened on the 28 April.

Referring to FIG. 3, a flow diagram 300 shows a second example embodiment in which a pair of events may be selected 301 for analysis. The two events have event identifiers.

The event occurrences in the body of historical events, which reference the two event identifiers are analyzed. For each event identifier, first occurrences and resolution events are interleaved 302 to create a merged list of first occurrences and resolutions.

First occurrences of an event instance of each of the selected event identifiers occurring within a first time window are identified and a score incremented 303.

Resolution of each of the pair of event instances within a second time window is identified 304. It may be determined 305 if the upstream first occurrences have been claimed as being resolved. If they have already been claimed, then the score is not incremented 306 for the instances of the resolution pair.

However, if the upstream first occurrence instances have not been claimed, the score for the instances of the resolution pair are incremented 307 and the upstream first occurrence instances are claimed as resolved.

A scoring metric may be used 308 to determine the relationship score between the pair of events.

The following is a worked example of the method of FIG. 3. The method works by counting resolution instances for the pair of events if the first occurrences have not been claimed as resolved.

For each event identifier, interleave the first occurrence and resolution events to create a merged list of first occurrences and resolutions.

Between each pair of event identities and across all the time period that the events have occurred:
If a pair of first occurrences from each event appear within a first given window increment a co-occurrence count by one.

If a pair of resolutions from each event appear within a second given window increment the co-occurrence count by one, if the pair of first occurrences that have been observed upstream is not already claimed. If count is incremented claim the up-stream first-occurrence pair.

Measure the strength of the relationship between two event identities (A and B say) with a metric such as:
COUNT CO-OCCURRENCES OF A AND B/MAX (COUNT FIRST OCCURRENCES OF A+COUNT OF RESOLUTIONS OF A, COUNT FIRST OCCURRENCES OF B+COUNT OF RESOLUTIONS OF B)

If the measure exceeds a threshold propose this relationship measure strength.

Referring to FIG. 4, a flow diagram 400 shows a third example embodiment of the aspect of comparing two event identifiers by analyzing and scoring their event instances including both their first occurrences of an instance and their resolution of the instance to obtain a relationship score between the two event identifiers.

In this embodiment, the combined scoring method is compared and augmented by a pure first occurrence method of relationship scoring and a pure resolution time method of relationship scoring.

A pair of events may be selected 401 for analysis. The two events have event identifiers. The event occurrences in the body of historical events, which reference the two event identifiers are analyzed.

A pure first occurrence method is used 402 to generate a first relationship score based on each pair of event identities and across all time that the events have occurred. This may be done using the following method indicated:
If a pair of first occurrences from each event appear within a given window increment a co-occurrence count by one;
Measure the strength of the relationship between the two event identities (A and B say) with a metric such as:
COUNT CO-OCCURRENCES OF A AND B/MAX (COUNT OCCURRENCES OF A, COUNT OCCURRENCES OF B);
If the measure exceeds a threshold infer a relation between these events.

A combined first occurrence and resolution time method may be used 403 as described in either of the methods of FIGS. 2 and 3 to generate a second relationship score. If the measure exceeds a threshold propose this measure strength in the merging step 405 below for consideration, along with the pairs that contributed to the increment in co-occurrence count. In other words, if a relationship score using the combined method is above a threshold strength, then it is a valid relationship.

A pure resolution time method is used 404 to generate a third relationship score based on each pair of event identities and across all time that the events have occurred. This may be done using the following method indicated:
If a pair of resolutions from each event appear within a given window increment a co-occurrence count by one;
Measure the strength of the relationship between the two event identities (A and B say) with a metric such as:
COUNT CO-OCCURRENCES OF RESOLUTION OF A AND B/MAX(COUNT OCCURRENCES OF A, COUNT OCCURRENCES OF B);
If the measure exceeds a threshold infer a relation between these events.

Merge 405 the relationship strengths found by the pure first occurrence method 302, the combined first occurrence and resolution time method 403, and the pure resolution time method 304. In one embodiment, the merged relationship strength may be used as the output.

In another embodiment, it may be determined if the merged result is less than that found by the pure first occurrence method 402 alone. If so, the score found by the pure first occurrence method 402 alone may be output 408.

If the merged result is greater than that found by the pure first occurrence method 402 alone, the score found by the merged result may be output 407.

It may be that there are not enough observations to find a confidence the pure first occurrence or pure resolution time methods but due to the large count volume of the combined method, a confidence number may be found which is relayed to the user.

Given the infrequency of observation (problems in performance management domain) resolution times are not frequently recurring in nature, and so a selection of the maximum strength seen, i.e. max (402, 403, 404), may be used.

As another possible embodiment, the method may merge instances of first occurrence and resolution time to create a list of timestamps for each event and use this list to mine rules. The method may forward all (possibly mixed) merge points for consideration by the end user as supporting pairs.

In all the described embodiments, additional considerations may be incorporated into the relationship strength determination including, for example, the using the ability to determine different types of detectors such as edge detectors or state detectors.

Figure 5A:
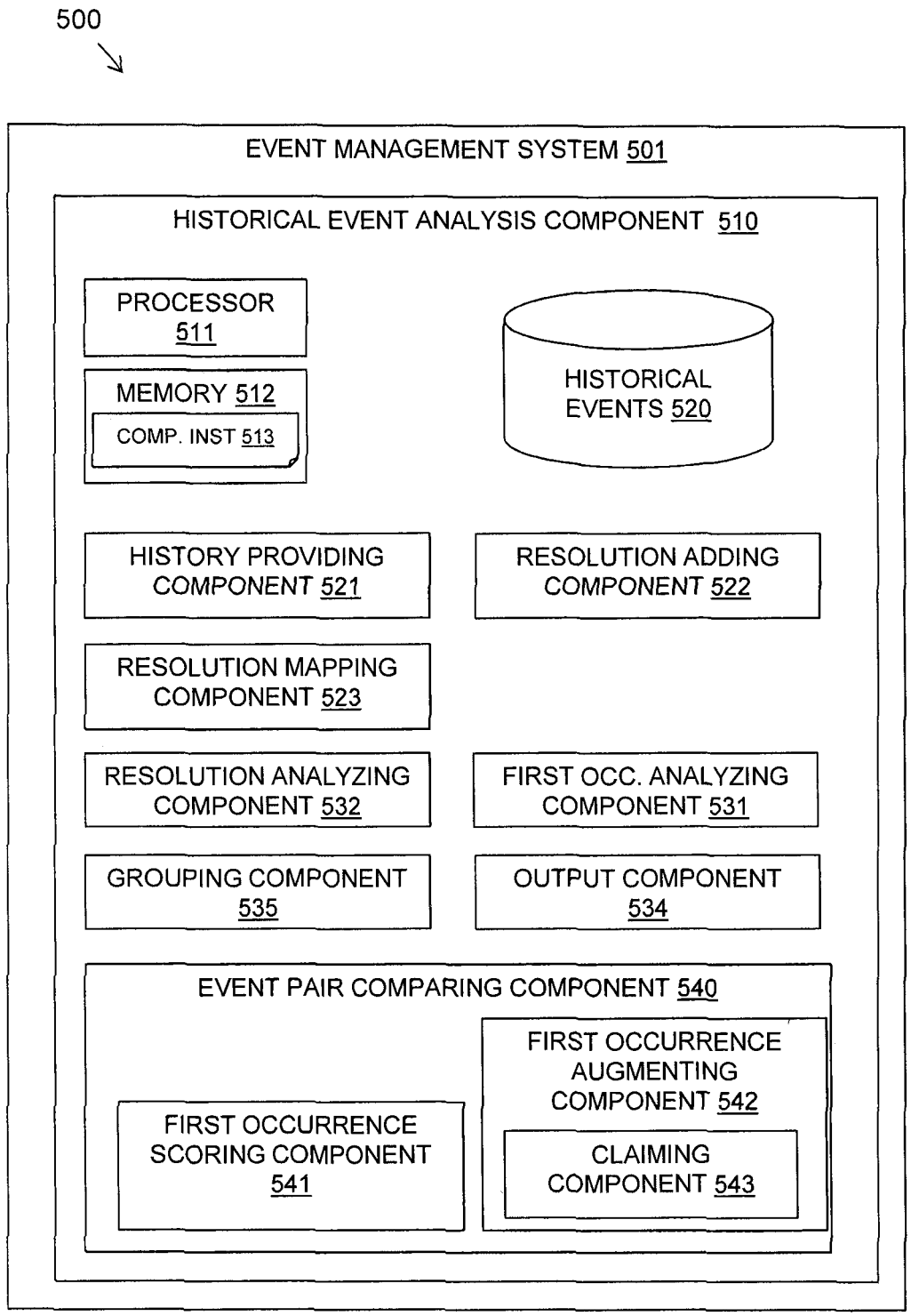
FIGS. 5A and 5B are block diagrams of two example embodiments of a system, in accordance with one or more aspects of the present invention.
Figure 5B:
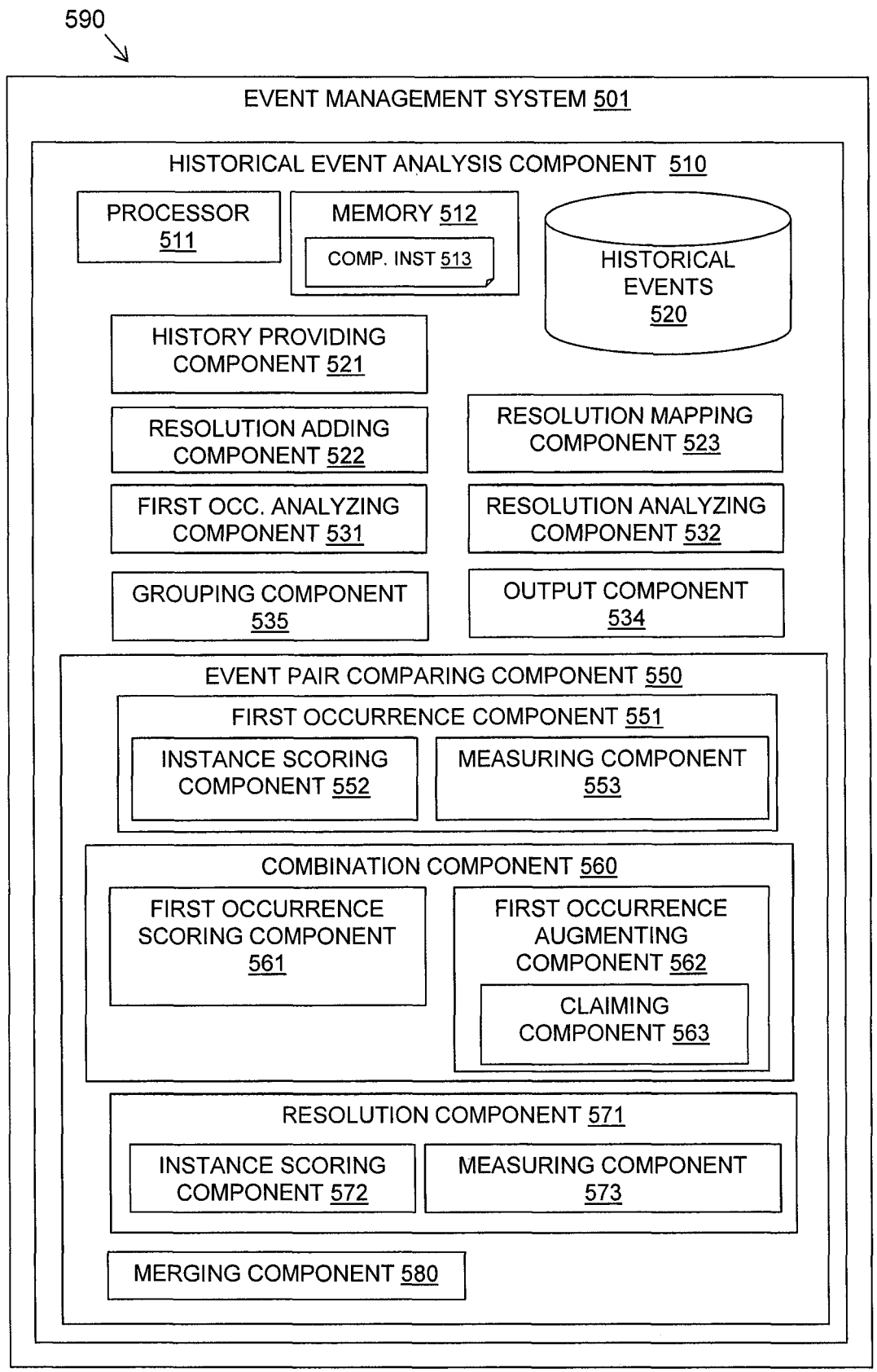

Referring to FIGS. 5A and 5B, block diagrams 500, 590 show two example embodiments of an event management system 501 which include an historical event analysis component 510. In both embodiments, the event management system 501 includes a related event analytic capability provided by the historical event analysis component 510 that learns relationships between events based on historical event data, which are presented as a set of groups which can be developed into correlation rules.

The historical event analysis component 510 include at least one at least one processor 511, a hardware module, or a circuit for executing the functions of the described components which may be software units executing on the at least one processor. Multiple processors running parallel processing threads may be provided enabling parallel processing of some or all of the functions of the components. Memory 512 may be configured to provide computer instructions 513 to the at least one processor 511 to carry out the functionality of the components.

The historical event analysis component 510 may be provided remotely as a service for event analysis to multiple systems. The historical event analysis component 510 may include or have access to a store of historical events 514 on which analysis is carried out.

The historical event analysis component 510 may include a history providing component 521 for providing a history of a plurality of event instances 520 relating to multiple events with each event instance having an event identifier of one of the multiple events and a timestamp. The history identifies event recurrences over time.

The historical event analysis component 510 may have a resolution adding component 522 for adding resolution event information to the historical events 520.

The historical event analysis component 510 may include a resolution mapping component 523 for mapping an identifier of an instance of resolution event information to one or more event identifiers. This component is required if the resolution event information has a resolution event identifier which is required to be mapped to one or more an event identifiers.

The historical event analysis component 510 may include a first occurrence analyzing component 531 for analyzing the historical event instances 520 relating to each event identifier to identify one or more first occurrence of an event.

The historical event analysis component 510 may include a resolution analyzing component 532 for analyzing the historical event instances 520 relating to each event identifier to identify event resolution times for each event.

The historical event analysis component 510 may include an event pair comparing component 540, 550 for comparing two events to obtain a relationship score between the two events. Comparing the two events is based on a combination of first occurrences of the events and resolution times of the events.

The historical event analysis component 510 may include an output component 534 for outputting the relationship scores between two events. The historical event analysis component 510 may include a grouping component for creating a group of events that are related based on the relationship scores.

In the embodiment shown in FIG. 5A, the event pair comparing component 540 may include a first occurrence scoring component 541 for scoring an instance of a pair of a first occurrence of each event occurring within a given time window and a first occurrence augmenting component 543 for augmenting the score based on resolution times of the events.

The first occurrence augmenting component 542 may increase the score of the scored instance of the pair first occurrence if the events of the scored instance of the pair of a first occurrence each have a resolution time within a given time window. Alternatively, the first occurrence augmenting component 542 is for scoring an instance of a resolution time of each event occurring within a given time window, if an upstream instance of a pair of first occurrence has not been claimed and may include a claiming component 543 for, if the instance of a resolution time of each event is scored, claiming the upstream instance of the pair of a first occurrence.

In an alternative embodiment, the event pair comparing component 540 may include a co-occurrence component for identifying a first occurrences of an event and resolutions times of an event to create a list of timestamps for each event; and a co-occurrence analyzing component for analyzing the first occurrences and resolution times of an event to obtain the relationship score.

In the embodiment shown in FIG. 5B, the event pair comparing component 550 may include a first occurrence component 551 for using a first occurrence method of scoring a pair of events to result in a first score, a combination component 560 for using a combination of a first occurrence and a resolution time to score a pair of events to result in a second score, and a resolution component 571 for using a resolution time to score a pair of events to result in a third score. A merging component 580 may be provided for merging the results of the first, second and third scores.

The combination component 560 may include components similar to those described in FIG. 5A of a first occurrence scoring component 561 for scoring an instance of a pair of a first occurrence of each event occurring within a given time window and a first occurrence augmenting component 562 for augmenting the score based on resolution times of the events, with optionally a claiming component 563 as previously described.

The first occurrence component 551 for using a first occurrence method of scoring a pair of events to result in a first score may include: an instance scoring component 552 for scoring an instance of a pair of a first occurrence of each event occurring within a given time window and a measuring component 553 for measuring a relationship score compared to the event occurrences within a time period.

The resolution component 571 for using a resolution time to score a pair of events to result in a third score may include an instance scoring component 572 for scoring an instance of a pair of a resolutions of each event occurring within a given time window and a measuring component 573 for measuring a relationship score compared to the event occurrences within a time period.

Those skilled in the art will note from the description provided herein that, according to a first aspect of the present invention, there is provided a computer-implemented method for event relationship analysis in fault management, comprising: providing a history of a plurality of event instances relating to multiple events identified by event identifies, wherein an event instance has one or more event occurrences referencing an event identifier and each event occurrence having a timestamp, the history including the event occurrences and resolution event information; analyzing the event occurrences relating to each event identifier to identify one or more first occurrence of an event instance; analyzing the resolution event information relating to each event identifier to identify any event resolution time for an event instance; comparing two event identifiers to obtain a relationship score between the two event identifiers, wherein the comparing is based on a combination of first occurrences of event instances relating to the two event identifiers and resolution times of the event instances; and creating a group of events that are related based on the relationship scores.

Using resolution time information in addition to first occurrence information for an event instance provides a faster learning of relationships.

Comparing two events identifiers to obtain a relationship score may include: scoring a pair of a first occurrence of each event identifier occurring within a given time window; and augmenting the score based on resolution times of the event instances of the event identifiers. In one embodiment, augmenting the score based on resolution times of the event instances of the event identifiers may include: increasing the score of the scored pair of first occurrences if the event instances each have a resolution time within a given time window. In another embodiment, augmenting the score based on resolution times of the event instances of the event identifiers may include: scoring a pair of resolution times of each event identifier occurring within a given time window, if an upstream pair of first occurrences has not been claimed; and if the pair of resolution times of each event identifier is scored, claiming the upstream pair of first occurrences.

Comparing two event identifiers to obtain a relationship score may include: identifying first occurrences of event instances of an event identifier and resolutions times of the event instances to create a list of timestamps for each event identifier; and analyzing the first occurrences and resolution times of two event identifiers to obtain the relationship score.

In one embodiment, comparing two event identifiers to obtain a relationship score may include: using a first occurrence method of scoring a pair of event identifiers to result in a first score; using a combination of a first occurrence and a resolution time to score a pair of event identifiers to result in a second score; using a resolution time to score a pair of event identifiers to result in a third score; merging the results of the first, second and third scores; and outputting the merged score if it is not less than the first score.

A first occurrence method of scoring a pair of events to result in a first score may include: scoring a pair of first occurrences of each event identifier occurring within a given time window; and measuring a relationship score compared to the total number of event occurrences within a time period.

A resolution time to score a pair of events to result in a third score may include: scoring a pair of resolutions of each event identifier occurring within a given time window; and measuring a relationship score compared to the total number of event occurrences within a time period.

Providing a history of a plurality of event instances relating to multiple events may include providing resolution event information including resolution times for event instances in the form of resolution events and/or additional resolution information. The method may include mapping an identifier of an instance of resolution event information to one or more event identifiers.

An event identifier may describe what has happened and to what device.

Creating a group of events that are related based on the relationship scores may group event identifiers with relationship scores above a threshold.

According to a second aspect of the present invention, there is provided a system for event relationship analysis in fault management, comprising: a processor and a memory configured to provide computer program instructions to the processor to execute the function of components; a history providing component for providing a history of a plurality of event instances relating to multiple events identified by event identifies, wherein an event instance has one or more event occurrences referencing an event identifier and each event occurrence having a timestamp, the history including the event occurrences and resolution event information; a first occurrence analyzing component for analyzing the event occurrences relating to each event identifier to identify one or more first occurrence of an event instance; a resolution analyzing component for analyzing the resolution event information relating to each event identifier to identify any event resolution time for an event instance; an event pair comparing component for comparing two event identifiers to obtain a relationship score between the two event identifiers, wherein the comparing is based on a combination of first occurrences of event instances relating to the two event identifiers and resolution times of the event instances; and a grouping component for creating a group of events that are related based on the relationship scores.

The event pair comparing component for comparing two events to obtain a relationship score may include: a first occurrence scoring component for scoring a pair of a first occurrence of each event identifier occurring within a given time window; and a first occurrence augmenting component for augmenting the score based on resolution times of the event instances of the event identifiers. In one embodiment, the first occurrence augmenting component may be for increasing the score of the scored pair of first occurrences if the event instances each have a resolution time within a given time window. In another embodiment, the first occurrence augmenting component may be for scoring a pair of resolution times of each event identifier occurring within a given time window, if an upstream pair of first occurrences has not been claimed, and includes a claiming component for, if the pair of resolution times of each event identifier is scored, claiming the upstream pair of a first occurrences.

The event pair component for comparing two events to obtain a relationship score may include: a co-occurrence component for identifying first occurrences of event instances of an event identifier and resolution times of the event instances to create a list of timestamps for each event identifier; and a co-occurrence analyzing component for analyzing the first occurrences and resolution times of two event identifiers to obtain the relationship score.

In one embodiment, the event pair component for comparing two event identifiers to obtain a relationship score may include: a first occurrence component for using a first occurrence method of scoring a pair of event identifiers to result in a first score; a combination component for using a combination of a first occurrence and a resolution time to score a pair of event identifiers to result in a second score; a resolution time component for using a resolution time to score a pair of event identifiers to result in a third score; a merging component for merging the results of the first, second and third scores; and an output component is for outputting the merged score if it is not less than the first score.

The first occurrence component for using a first occurrence method of scoring a pair of events to result in a first score may include: an instance scoring component for scoring a pair of first occurrences of each event identifier occurring within a given time window; and a measuring component for measuring a relationship score compared to the total number of event occurrences within a time period.

The resolution component for using a resolution time to score a pair of events to result in a third score may include: an instance scoring component for scoring a pair of resolutions of each event identifier occurring within a given time window; and a measuring component for measuring a relationship score compared to the total number of event occurrences within a time period.

The system may include a resolution adding component for adding resolution event information to a history of a plurality of event instances. The system may also include a resolution mapping component for mapping an identifier of an instance of resolution event information to one or more event identifiers.

The grouping component for creating a group of events that are related based on the relationship scores may group event identifiers with relationship scores above a threshold.

According to a third aspect of the present invention, there is provided a computer program product for event relationship analysis in fault management, the computer program product comprising a computer readable storage medium having program instructions embodied therewith, the program instructions executable by a processor to cause the processor to: provide a history of a plurality of event instances relating to multiple events identified by event identifies, wherein an event instance has one or more event occurrences referencing an event identifier and each event occurrence having a timestamp, the history including the event occurrences and resolution event information; analyze the event occurrences relating to each event identifier to identify one or more first occurrence of an event instance; analyze the resolution event information relating to each event identifier to identify any event resolution time for an event instance; compare two event identifiers to obtain a relationship score between the two event identifiers, wherein the comparing is based on a combination of first occurrences of event instances relating to the two event identifiers and resolution times of the event instances; and create a group of events that are related based on the relationship scores.

The described aspects of the invention provide the advantage of providing an improved correlation between events by including resolution times of event occurrences whilst overcoming problems of the reliability of resolution information.

Figure 6:
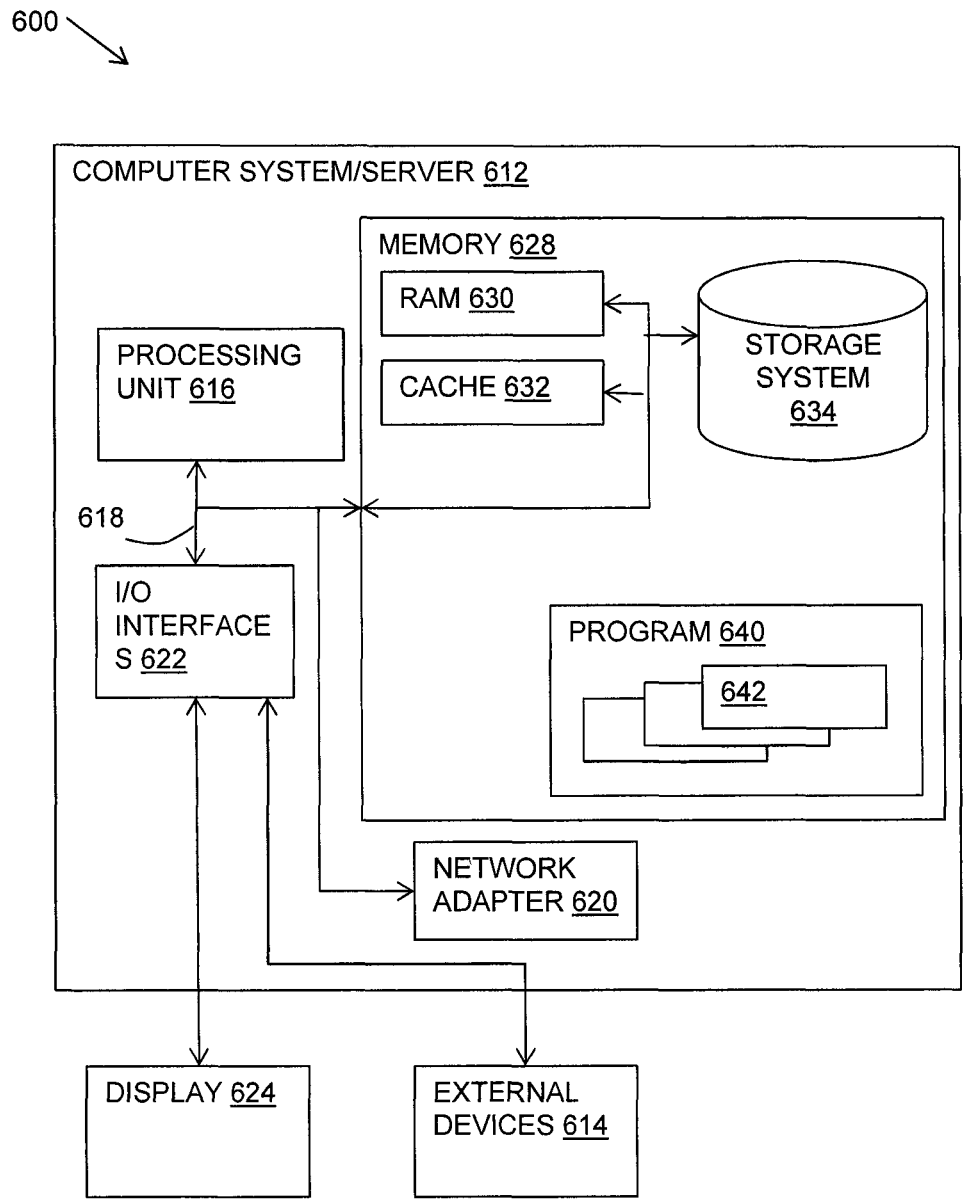
FIG. 6 is a block diagram of an embodiment of a computer system or cloud server in which one or more aspects of the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
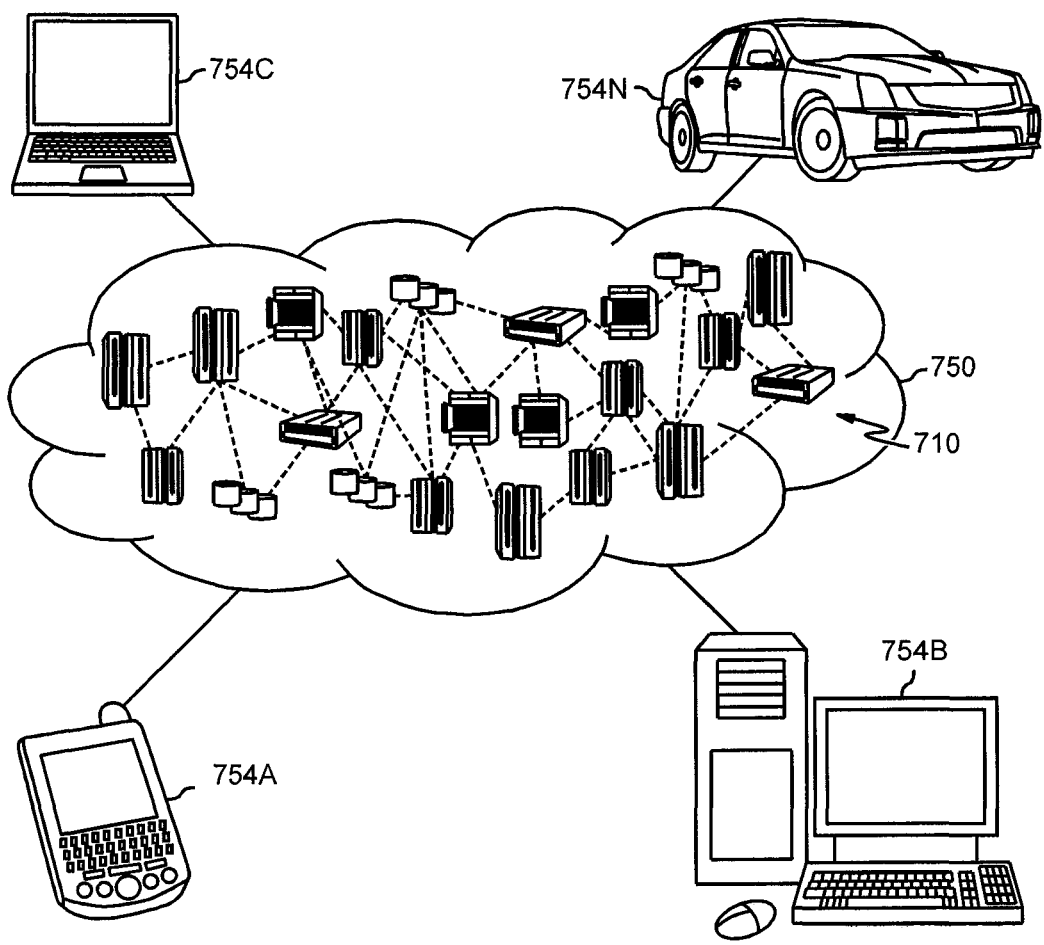
FIG. 7 is a schematic diagram of a cloud computing environment in which one or more aspects of the present invention may be implemented.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
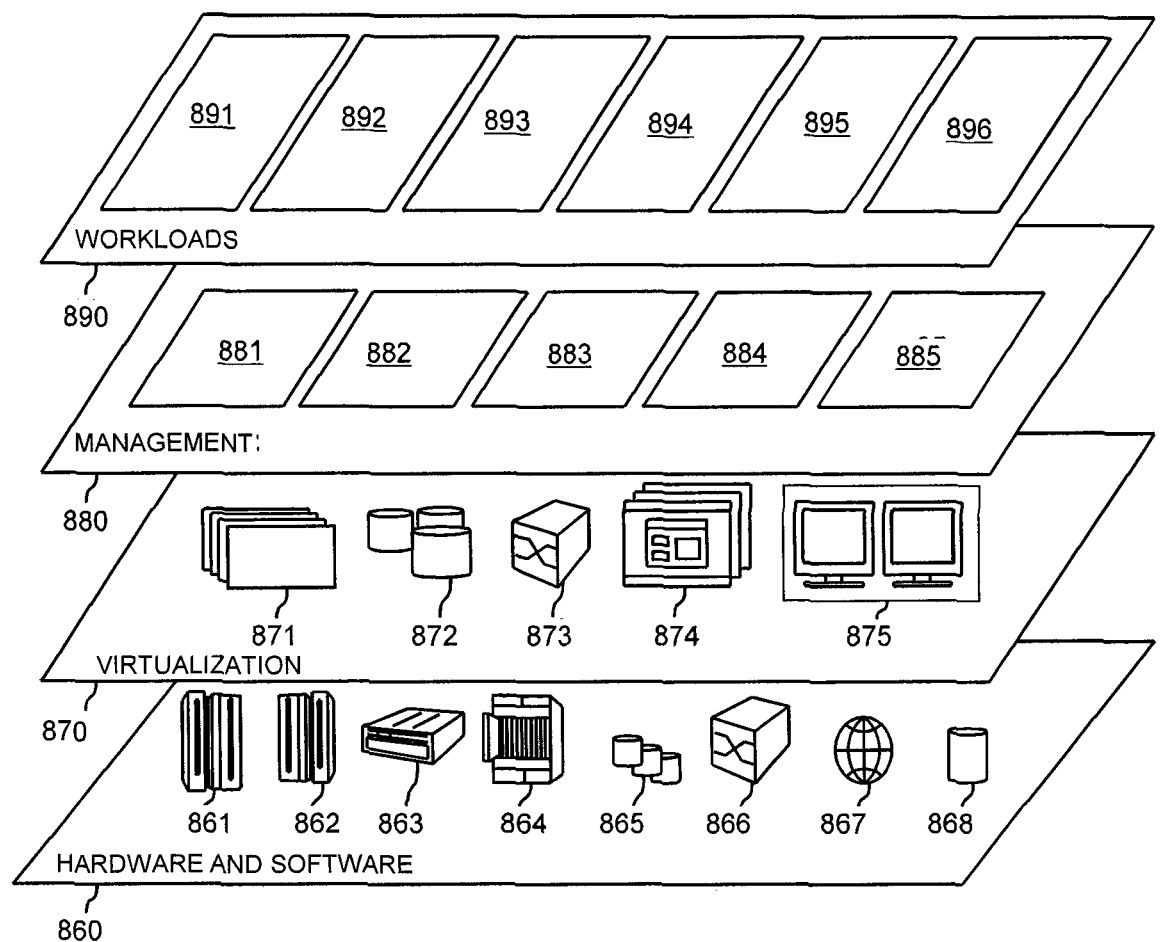
FIG. 8 is a diagram of abstraction model layers of a cloud computing environment in which one or more aspects of the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; and transaction processing 895; and event processing 895 including as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for event relationship analysis in fault management, the computer-implemented method comprising:
   providing a history of a plurality of event instances relating to multiple events identified by event identifiers, wherein an event instance has one or more event occurrences referencing an event identifier and each event occurrence has a timestamp, the history including the event occurrences and resolution event information;
   analyzing the event occurrences relating to each event identifier to identify one or more first occurrence of an event instance;
   analyzing the resolution event information relating to each event identifier to identify any event resolution time for an event instance;
   comparing two event identifiers to obtain a relationship score between the two event identifiers, wherein the comparing is based on a combination of first occurrences of event instances relating to the two event identifiers and resolution times of the event instances; and
   creating a group of events that are related based on the relationship scores.

2. The computer-implemented method of claim 1, wherein comparing two event identifiers to obtain a relationship score includes:
   scoring a pair of a first occurrence of each event identifier occurring within a given time window; and
   augmenting the score based on resolution times of the event instances of the event identifiers.

3. The computer-implemented method of claim 2, wherein augmenting the score based on resolution times of the event instances of the event identifiers includes:
   increasing the score of the scored pair of first occurrences if the event instances each have a resolution time within a given time window.

4. The computer-implemented method of claim 2, wherein augmenting the score based on resolution times of the event instances of the event identifiers includes:
   scoring a pair of resolution times of each event identifier occurring within a given time window, if an upstream pair of first occurrences has not been claimed; and
   if the pair of resolution times of each event identifier is scored, claiming the upstream pair of first occurrences.

5. The computer-implemented method of claim 1, wherein comparing two event identifiers to obtain a relationship score includes:
   identifying first occurrences of event instances of an event identifier and resolutions times of the event instances to create a list of timestamps for each event identifier; and
   analyzing the first occurrences and resolution times of two event identifiers to obtain the relationship score.

6. The computer-implemented method of claim 1, wherein comparing two event identifiers to obtain a relationship score includes:
   using a first occurrence method of scoring a pair of event identifiers to result in a first score;
   using a combination of a first occurrence and a resolution time to score a pair of event identifiers to result in a second score;
   using a resolution time to score a pair of event identifiers to result in a third score;
   merging the results of the first, second and third scores; and
   outputting the merged score if it is not less than the first score.

7. The computer-implemented method of claim 6, wherein using a first occurrence method of scoring a pair of events to result in a first score, includes:
   scoring a pair of first occurrences of each event identifier occurring within a given time window; and
   measuring a relationship score compared to the total number of event occurrences within a time period.

8. The computer-implemented method of claim 6, wherein using a resolution time to score a pair of events to result in a third score, includes:
   scoring a pair of resolutions of each event identifier occurring within a given time window; and
   measuring a relationship score compared to the total number of event occurrences within a time period.

9. The computer-implemented method of claim 1, wherein providing a history of a plurality of event instances relating to multiple events, includes providing resolution event information including resolution times for event instances in the form of resolution events and/or additional resolution information.

10. The computer-implemented method of claim 1, further comprising mapping an identifier of an instance of resolution event information to one or more event identifiers.

11. The computer-implemented method of claim 1, wherein an event identifier describes what has happened and to what device.

12. The computer-implemented method of claim 1, wherein creating a group of events that are related based on the relationship scores groups event identifiers with relationship scores above a threshold.

13. A system for event relationship analysis in fault management, the system comprising:
   a memory; and
   a processor communicatively coupled to the memory, wherein the system performs a method comprising:
      providing a history of a plurality of event instances relating to multiple events identified by event identifiers, wherein an event instance has one or more event occurrences referencing an event identifier and each event occurrence has a timestamp, the history including the event occurrences and resolution event information;

analyzing the event occurrences relating to each event identifier to identify one or more first occurrence of an event instance;

analyzing the resolution event information relating to each event identifier to identify any event resolution time for an event instance;

comparing two event identifiers to obtain a relationship score between the two event identifiers, wherein the comparing is based on a combination of first occurrences of event instances relating to the two event identifiers and resolution times of the event instances; and creating a group of events that are related based on the relationship scores.

14. The system of claim 13, wherein comparing two events to obtain a relationship score includes:

scoring a pair of a first occurrence of each event identifier occurring within a given time window; and augmenting the score based on resolution times of the event instances of the event identifiers.

15. The system of claim 13, wherein augmenting the score based on resolution times of the event instances of the event identifiers includes:

increasing the score of the scored pair of first occurrences if the event instances each have a resolution time within a given time window.

16. The system of claim 15, wherein augmenting the score based on resolution times of the event instances of the event identifiers includes:

scoring a pair of resolution times of each event identifier occurring within a given time window, if an upstream pair of first occurrences has not been claimed; and if the pair of resolution times of each event identifier is scored, claiming the upstream pair of first occurrences.

17. The system of claim 13, wherein comparing two event identifiers to obtain a relationship score includes:

identifying first occurrences of event instances of an event identifier and resolutions times of the event instances to create a list of timestamps for each event identifier; and analyzing the first occurrences and resolution times of two event identifiers to obtain the relationship score.

18. The system of claim 13, wherein comparing two event identifiers to obtain a relationship score includes:

using a first occurrence method of scoring a pair of event identifiers to result in a first score;

using a combination of a first occurrence and a resolution time to score a pair of event identifiers to result in a second score;

using a resolution time to score a pair of event identifiers to result in a third score;

merging the results of the first, second and third scores; and outputting the merged score if it is not less than the first score.

19. The system of claim 18, wherein using a first occurrence method of scoring a pair of events to result in a first score, includes:

scoring a pair of first occurrences of each event identifier occurring within a given time window; and measuring a relationship score compared to the total number of event occurrences within a time period.

20. A computer program product for event relationship analysis in fault management, the computer program product comprising:

a computer readable storage medium having program instructions embodied therewith, the program instructions being executable by a processor to cause the processor to perform a method comprising:

providing a history of a plurality of event instances relating to multiple events identified by event identifiers, wherein an event instance has one or more event occurrences referencing an event identifier and each event occurrence has a timestamp, the history including the event occurrences and resolution event information;

analyzing the event occurrences relating to each event identifier to identify one or more first occurrence of an event instance;

analyzing the resolution event information relating to each event identifier to identify any event resolution time for an event instance;

comparing two event identifiers to obtain a relationship score between the two event identifiers, wherein the comparing is based on a combination of first occurrences of event instances relating to the two event identifiers and resolution times of the event instances; and creating a group of events that are related based on the relationship scores.

* * * * *